(12) United States Patent
Edwards

(10) Patent No.: US 6,419,359 B2
(45) Date of Patent: Jul. 16, 2002

(54) SURFACE DESIGN METHOD

(75) Inventor: James Alan Edwards, 409 C Ave., Lawton, OK (US) 73501

(73) Assignees: James Alan Edwards, Lawton, OK (US); Scott E. Lewis, Ponte Vedra Beach, FL (US)

( * ) Notice: Subject to any disclaimer, the term of this patent is extended or adjusted under 35 U.S.C. 154(b) by 4 days.

(21) Appl. No.: 09/768,067

(22) Filed: Jan. 23, 2001

Related U.S. Application Data

(60) Provisional application No. 60/195,959, filed on Apr. 11, 2000.

(51) Int. Cl.$^7$ ............................. G02C 7/02; G02C 7/04; A61F 2/16
(52) U.S. Cl. ...................................... 351/177; 623/6.11
(58) Field of Search ............................ 351/177, 160 R, 351/160 H, 161; 623/6.11

(56) References Cited

U.S. PATENT DOCUMENTS

| | | | | |
|---|---|---|---|---|
| 5,452,031 A | * | 9/1995 | Ducharme | ................. 351/177 |
| 5,592,246 A | | 1/1997 | Kuhn et al. | |
| 5,695,509 A | | 12/1997 | El Hage | |
| 5,724,138 A | | 3/1998 | Reigh et al. | |
| 5,861,114 A | | 1/1999 | Roffman et al. | |
| 5,880,809 A | | 3/1999 | Lieberman et al. | |
| 5,953,098 A | | 9/1999 | Lieberman et al. | |

* cited by examiner

*Primary Examiner*—Scott J. Sugarman
(74) *Attorney, Agent, or Firm*—Thomas C. Saitta

(57) ABSTRACT

A surface design method for designing refractive optical devices, and the optical devices themselves, using a wave transform analysis technique to control aberrations and produce a device with more precise refractive properties in response to topographical data derived from the corneal surface. The method can be used to produce other output surfaces.

20 Claims, No Drawings

SURFACE DESIGN METHOD

This application claims the benefit of the U.S. Provisional Patent Application Ser. No. 60/195,959, filed Apr. 11, 2000.

BACKGROUND OF THE INVENTION

This invention relates generally to a method or technique of designing, defining and generating a surface to correspond to a primary surface or to provide an optical device producing desired refraction effects, where the output surface definition is based on analysis of an input surface definition, as well as to such surfaces or optical devices so produced. The method may be utilized to provide control data to various surface generation instruments, such as CNC lathe equipment, laser surfacing equipment and mold generating instruments, for example. It is particularly suitable for producing customized contact lenses of specific surface topographies in response to measurements of the corneal surface.

Optical systems used for ophthalmic purposes, such as for example contact lenses or intraocular lens implants, are designed to provide clear vision when viewing various targets located at different locations in space. In the past, lenses have been designed to optimize a specific range of distances presented from a specific range of angles of view. The task of designing optical surfaces for ophthalmic lenses has been primarily approached by using surface formulas based upon polynomial mathematics which describe curves as a single equation containing numerous variables that can be modified in an attempt to control aberrations at different points across the surface. The results typically included compromises at some point, distance or angle within the overall system to account for the lack of defined precision at particular finite points, meaning that accuracy at any particular point is often sacrificed due to the inability to more precisely define in a mathematical sense the necessary parameters at a given point. Likewise, the known production methodologies typically fail to account for variations in individual corneal surfaces between patients having identical or equivalent vision problems, such that the actual optical corrections provided by lenses designed with the same corrective characteristics will vary relative to each individual patient.

The present method is a method of optical surface design which does not depend on polynomial mathematics for aberration control. In this method, each section of the lens can be designed independently from other areas of the lens. Spherical aberration is an optical defect which describes the fact that light rays entering a refractive surface for focusing, such as the cornea of a human eye, are less strongly focused at the center of the curved refractive surface and are progressively focused more strongly as the distance from the center of the cornea increases. The image is therefore not focused onto a single point on the retina, but is instead focused at multiple focal points short of the intended focal point, which results in blurred vision. The mathematical basis for this method is founded on digital signal processing concepts including the principles of wavelet transform analysis.

It is therefore an object of this invention to provide a method for producing from resulting digital data an output surface, or the definition of an output surface, with desired characteristics based on input data from an input surface or mathematical description, where the method provides a more accurate output surface relative to each point on its surface. It is a further object to provide such a method which is particularly suited to producing accurate optical output surfaces, such as on a contact lens or intraocular lens, based on input derived from the corneal surface of the eye of a patient.

SUMMARY OF THE INVENTION

The process involves the steps of first defining a baseline surface from input data derived from or defined as an input surface definition, where the input data may be a result of data generated by testing instrumentation, such as for example topography measurement instruments or wavefront measurement instruments, or a result of mathematical modeling of a surface, such as for example a sphere on an ellipsoid. The input data is formatted by defining an apex as a point on the input surface located on a line which serves as a reference axis that is perpendicular to a plane which tangential to the curvature of the surface at the apex. The input data is then analyzed and formatted into discrete, evenly spaced points across an adequate number of semi-meridians converging at the apex for accuracy, with points on each semi-meridian peripheral to the apex defined in terms of x and z coordinates, with x designating the distance from the reference axis and z designating the distance from a line in the plane perpendicular to the axis that passes through the apex, and a convolution function is performed to create a surface that is smoothed to within a specific threshold of curvatures at any point on the surface. The desired surface characteristics at a particular point on the output surface or the desired optical effect at a particular point on the lens in terms of curvature is then defined. An arbitrary amplitude is assigned to a one quarter wavelength phase range of a sinusoidal function, beginning at either one quarter or three quarter wavelength, and this is added to the source data. The curvature after the initial phase range is added to the source data is then calculated, and a bracketing algorithm is employed to adjust the amplitude of the one quarter wavelength function until the target curvature is obtained. The amount of induced distortion from the resultant data is measured, and an arbitrary value is assigned to a one quarter wavelength of twice the original wavelength and 180 degrees change in phase angle, and the results are added to the first summation. A bracketing algorithm is then utilized to adjust the surface until a minimal amount of distortion is measured in resultant data. The resultant data in digital format thus represents the targeted optical effect, and can be used as input for various surface generation instruments. Thus, for example, topographical data derived from the surface of a patient's cornea can be manipulated as above to produce a customized contact lens or an intraocular lens for the patient with surface topography matched to the cornea such that optimal optical effects are produced by the lens. The topographical data of the corneal surface can also be utilized, for example, to produce a control mask for laser sculpting of the corneal surface.

DETAILED DESCRIPTION OF THE INVENTION

The method will de defined as follows with particular reference to its use a methodology for the production of optical lens surfaces, such as those found on the surface of a contact lens or intraocular lens implant, but it is to be understood that the method can be utilized for the production of other surfaces as well, where input data is derived from a first surface or a mathematical description, manipulated and analyzed with regard to desired characteristics or properties for the output surface, and the resulting data used to produce the output surface.

A baseline surface is first defined from input data. The baseline surface description can come from input data from instrumentation testing, such as for example, but not exclusively, surface topography measurement instruments such as topography or wavefront measurement instruments, where for example the surface of a patient's cornea is measured, or the baseline surface can simply be the mathematical description of a surface, such as a sphere or an ellipsoid, which may be the situation encountered in the production of a laser sculpting mask, for example. Initially the topographical input data provided by the instrumentation is not in a digital format. For example, topographical input data for a corneal surface may be obtained by imaging concentric rings onto the cornea and then taking a two-dimensional representation of the reflection. The baseline input data is formatted as, preferably, 256 or more equally spaced meridians converging at the apex of the baseline surface, although the number of meridians is not critical. The apex is a point on the surface that is located on a line, which serves as a reference axis that is perpendicular to a plane, which is tangential to the curvature of the surface at the apex. Along each meridian, each point peripheral to the apex is defined in x and z coordinates, with x designating the distance from the reference axis and z designating the distance from a line in the plane perpendicular to the axis that passes through the apex. In this way, elevation data in each meridian can be represented in a two dimensional Cartesian coordinate system with each meridian's data measured relative to the same axis. If the input data is presented in grid form, it is translated into meridian form.

Each meridian of the baseline surface is analyzed and formatted into discrete, evenly spaced points that are separated from each other by a constant amount which represents the sampling rate needed for the particular application. Any z coordinate points not represented in the raw source data are interpolated by calculating the instantaneous curvature and offset of the center of curvature as the surface gradually transitions from one data point to another. This operation digitizes the baseline data so that the baseline is represented at a constant sampling rate across the entire surface. By formatting the baseline data in this fashion, the baseline surface description can be treated as a digital signal from this point on.

A mathematical kernel function is performed in a radial fashion across each meridian, i.e., including opposing semi-meridians passing through the apex, and in a circumferential fashion at each annular ring created by the sampling rate chosen in the step above to operate as a band pass filter to eliminate high frequency components of the baseline data. For example, each point's z coordinate is changed to the average of the next ten peripheral points added to the previous ten points. This running average is referred to as a convolution and serves as a noise filter to eliminate high frequency component wavelengths in the baseline data, the convolution acting to smooth or normalize the digitized data points within a specific threshold of curvatures at any point.

The user defines the optical effect, or particular output surface property, desired within a particular region, defined as the target zone, on the lens in terms of radius of curvature and width, such as for example a particular dioptic power. The target zone is defined by a minimum and maximum set of x coordinates and a given meridian. For example, the user may set as a target that the surface have an average curvature of 7.5 mm in the region extending from 1.0 mm (the start point) from the apex to 2.0 mm from the apex (the endpoint).

A first sinusoidal wave function is used to modify the z coordinate of each point within the target zone width. The basic wave formula $z=a \sin(2pi(x/wavelength))$, where a is the unknown amplitude, which may be zero, is modified with a DC offset equal to the amplitude of the wave. For example, the equation $z\ a\ \sin(2pi((x\text{-starting point}+(wavelength/4))/wavelength)+1)$ is used so that when wavelength=(endpoint-starting point) and x=starting point, the result is always zero, and when x=endpoint, the result is zero. The result of this equation can also be projected onto an axis perpendicular to the tangent of the baseline data at each point across the surface.

A first bracketing algorithm is employed which adjusts the amplitude of the wave function. From the example above, the instantaneous curvature in the center of the target zone is measured by applying basic trigonometric equations to the coordinates of three points centered on 1.5 mm (any three points define a circle). An arbitrary amplitude for the wave equation above is used (for example, 10 microns) and the z value of each point within the target zone of the baseline data set is algebraically added to the result obtained from the wave equation above across the zone. The resultant modified data subset representing the target zone is then measured to determine the radius of curvature at the 1.5 mm point. If the curvature is less than the target curvature, the amplitude is reduced and the operation is repeated. Upon each iteration, the amplitude is adjusted in the appropriate direction until a final arbitrary amplitude value producing the desired target curvature is obtained. In this fashion the curvature within the target zone can be modified without affecting the data outside the target range because the result of the wave equation is zero at the beginning and end of the zone due to the DC offset, wavelength, and phase range chosen.

The amount of spherical optical aberrations induced by the operations above can then be measured in terms of astigmatism and coma (or tilt) using interpolated data at a sampling rate not less than the baseline data sampling rate.

A subsequent sinusoidal wave function using a wavelength of twice the final arbitrary amplitude value used above and with a 180 degree change in phase angle is then applied to the target zone data that has been modified by the above step. In this case however, at the starting point the wave equation will evaluate to zero but at the outer limit of the target zone the wave equation will evaluate to twice the amplitude value used in the equation. This operation functions to alter the tilt of the surface data without altering the curvature at the center of the target zone.

A bracketing algorithm technique similar to the bracketing algorithm technique used above is then employed by applying a subsequent bracketing algorithm to adjust the surface tilt within the target zone until a minimal amount of aberration is measured in the resultant data subset representing the target zone. To maintain surface regularity, subsequent to this operation all baseline data peripheral to the target zone is altered by a DC offset equal to twice the amplitude of the wave equation. This will not change any curvature or tilt information contained in the data peripheral to the target zone.

The above steps are reiterated until the entire output surface has been properly defined.

Using this technique of data processing, the baseline surface is modified from the apex toward the periphery with the results of the previous calculations serving as the baseline data for each subsequent (more peripheral) zone modification operation. It is important to note that this technique of surface design is based upon defining and treating each zone independently from the rest of the surface. Each zone is however treated in the same mathematical fashion using established information processing techniques. Curvature and aberration is not then merely predicted at each point across the surface by this technique, but rather is measured after each operation to insure that the desired target optical effect is obtained.

The resultant output surface description can be used as the input for various surface generation instrumentations, including CNC lathe equipment, laser surfacing equipment and mold generating instrumentation, in order to create a desired product. For example, contact lens, intraocular lens disposed within the eye, or control masks for laser sculpting—a planar plastic device having areas of different thickness which controls the duration of a laser striking a given portion of the cornea—of very high accuracy can be produced using this technique.

It is understood and contemplated that certain equivalents and substitutions for individual elements set forth above may be obvious to those skilled in the art, and thus the true scope and definition of the invention is to be as set forth in the following claims.

I claim:

1. A method of defining an output surface having desired characteristics based on input data derived from an input surface, comprising the steps of:

(A) defining a baseline surface from input data derived from an input surface;

(B) formatting said input data by defining an apex of the baseline surface, said apex being a point on said baseline surface located on an axis defined by a line perpendicular to a plane tangential to the curvature of the surface at said apex, and further defining a plurality of equally spaced meridians passing through said apex, such that each point on any said meridian is defined in x and z coordinates, where x designates the distance of said point from the said axis and z designates the distance of said point from a line in said plane perpendicular to said axis and passing through said apex;

(C) formatting said input data into discrete, evenly spaced points having a constant separation distance, and interpolating any z coordinates not represented in the input data in order to digitize said input data points;

(D) performing a convolution function in a radial fashion across each meridian and in a circumferential fashion at each annular ring defined by said constant separation distance to create a running average within a specific threshold of curvatures to normalize said input data at each said digitized point;

(E) defining a target zone in terms of curvature and width with a desired output surface property for sets of x coordinates and a given meridian;

(F) modifying the z coordinate for each digitized point within each said target zone using a first sinusoidal wave function $z=a \sin(2pi(x/wavelength))$, where a is an unknown amplitude, which may be zero, modified with a DC offset equal to the amplitude of the wave;

(G) adjusting the amplitude of said wave function using a first bracketing algorithm using an arbitrary amplitude value, calculating the resulting curvature, and repeating said amplitude adjusting step with different arbitrary amplitude values to obtain a final arbitrary amplitude value producing target zone data with said defined curvature within said target zone is obtained;

(H) measuring the amount of said output surface property thereby induced;

(I) applying to said target zone data a subsequent sinusoidal wave function having twice the arbitrary amplitude value and a 180 degree change in phase angle of said first sinusoidal wave function;

(J) adjusting the amplitude of said subsequent wave function using a subsequent bracketing algorithm using an arbitrary amplitude value, calculating the resulting curvature, and repeating said amplitude adjusting step with different arbitrary amplitude values to obtain a final arbitrary amplitude value producing target zone data with said defined curvature within said target zone is obtained; and (K) reiterating steps (E) through (J) to define an output surface.

2. The method of claim 1, further comprising the steps of (L) inputting said target zone data into a surface generation instrument; and (M) creating an output surface.

3. The method of claim 1, wherein said step of deriving input data is performed using surface topography measurement instruments.

4. The method of claim 1, wherein said step of deriving input data is performed by calculating mathematical definitions of a surface.

5. The method of claim 2, wherein said surface generation instruments consist of instruments chosen from the group consisting of CNC lathe equipment, laser surfacing equipment and mold generating instrumentation.

6. A method of defining an optical output surface having desired optical refractive characteristics based on input data derived from an input surface, comprising the steps of:

(A) defining a baseline surface from input data derived from an input surface;

(B) formatting said input data by defining an apex of the baseline surface, said apex being a point on said baseline surface located on an axis defined by a line perpendicular to a plane tangential to the curvature of the surface at said apex, and further defining a plurality of equally spaced meridians passing through said apex, such that each point on any said meridian is defined in x and z coordinates, where x designates the distance of said point from the said axis and z designates the distance of said point from a line in said plane perpendicular to said axis and passing through said apex;

(C) formatting said input data into discrete, evenly spaced points having a constant separation distance, and interpolating any z coordinates not represented in the input data in order to digitize said input data points;

(D) performing a convolution function in a radial fashion across each meridian and in a circumferential fashion at each annular ring defined by said constant separation distance to create a running average within a specific threshold of curvatures to normalize said input data at each said digitized point;

(E) defining a target zone in terms of curvature and width with a desired optical output surface property for sets of x coordinates and a given meridian;

(F) modifying the z coordinate for each digitized point within each said target zone using a first sinusoidal wave function $z=a \sin(2pi(x/wavelength))$, where a is an unknown amplitude, which may be zero, modified with a DC offset equal to the amplitude of the wave;

(G) adjusting the amplitude of said wave function using a first bracketing algorithm using an arbitrary amplitude value, calculating the resulting curvature, and repeating said amplitude adjusting step with different arbitrary amplitude values to obtain a final arbitrary amplitude value producing target zone data with said optical output surface property within said target zone is obtained;

(H) measuring the amount of spherical optical aberrations thereby induced;

(I) applying to said target zone data a subsequent sinusoidal wave function having twice the arbitrary amplitude value and a 180 degree change in phase angle of said first sinusoidal wave function;

(J) adjusting the amplitude of said subsequent wave function using a subsequent bracketing algorithm using an arbitrary amplitude value, calculating the resulting curvature, and repeating said amplitude adjusting step with different arbitrary amplitude values to obtain a final arbitrary amplitude value producing target zone data with said defined curvature within said target zone is obtained; and (K) reiterating steps (E) through (J) to define an output surface.

7. The method of claim 6, further comprising the steps of (L) inputting said target zone data into a surface generation instrument; and (M) creating an output surface.

8. The method of claim 6, wherein said step of deriving input data is performed using surface topography measurement instruments of a cornea.

9. The method of claim 6, wherein said step of deriving input data is performed by calculating mathematical definitions of a surface.

10. The method of claim 7, wherein said surface generation instruments consist of instruments chosen from the group consisting of CNC lathe equipment, laser surfacing equipment and mold generating instrumentation.

11. The method of claim 7, wherein said step of creating an output surface is performed on a contact lens.

12. The method of claim 7, wherein said step of creating an output surface is performed on an intraocular lens.

13. The method of claim 7, wherein said step of creating an output surface is performed on a control mask for laser sculpting.

14. An optical output surface device having desired optical refractive characteristics based on input data derived from an input surface, produced by a method comprising the steps of:

(A) defining a baseline surface from input data derived from an input surface;

(B) formatting said input data by defining an apex of the baseline surface, said apex being a point on said baseline surface located on an axis defined by a line perpendicular to a plane tangential to the curvature of the surface at said apex, and further defining a plurality of equally spaced meridians passing through said apex, such that each point on any said meridian is defined in x and z coordinates, where x designates the distance of said point from the said axis and z designates the distance of said point from a line in said plane perpendicular to said axis and passing through said apex;

(C) formatting said input data into discrete, evenly spaced points having a constant separation distance, and interpolating any z coordinates not represented in the input data in order to digitize said input data points;

(D) performing a convolution function in a radial fashion across each meridian and in a circumferential fashion at each annular ring defined by said constant separation distance to create a running average within a specific threshold of curvatures to normalize said input data at each said digitized point;

(E) defining a target zone in terms of curvature and width with a desired optical output surface property for sets of x coordinates and a given meridian;

(F) modifying the z coordinate for each digitized point within each said target zone using a first sinusoidal wave function $z=a \sin(2pi(x/\text{wavelength}))$, where a is an unknown amplitude, which may be zero, modified with a DC offset equal to the amplitude of the wave;

(G) adjusting the amplitude of said wave function using a first bracketing algorithm using an arbitrary amplitude value, calculating the resulting curvature, and repeating said amplitude adjusting step with different arbitrary amplitude values to obtain a final arbitrary amplitude value producing target zone data with said optical output surface property within said target zone is obtained;

(H) measuring the amount of spherical optical aberrations thereby induced;

(I) applying to said target zone data a subsequent sinusoidal wave function having twice the arbitrary amplitude value and a 180 degree change in phase angle of said first sinusoidal wave function;

(J) adjusting the amplitude of said subsequent wave function using a subsequent bracketing algorithm using an arbitrary amplitude value, calculating the resulting curvature, and repeating said amplitude adjusting step with different arbitrary amplitude values to obtain a final arbitrary amplitude value producing target zone data with said defined curvature within said target zone is obtained;

(K) reiterating steps (E) through (J) to define an output surface;

(L) inputting said target zone data into a surface generation instrument; and (M) creating an output surface.

15. The device of claim 14, wherein said step of deriving input data is performed using surface topography measurement instruments of a cornea.

16. The device of claim 14, wherein said step of deriving input data is performed by calculating mathematical definitions of a surface.

17. The device of claim 14, wherein said surface generation instruments consist of instruments chosen from the group consisting of CNC lathe equipment, laser surfacing equipment and mold generating instrumentation.

18. The device of claim 14, wherein said device is a contact lens.

19. The device of claim 14, wherein said device is an intraocular lens.

20. The device of claim 14, wherein said device is a control mask for laser sculpting.

* * * * *